United States Patent [19]

Bergmann et al.

[11] 4,110,680
[45] Aug. 29, 1978

[54] METHOD AND APPARATUS FOR MEASURING THE QUANTITY OF A FLUID FLOWING THROUGH A PIPE BY MEANS OF NUCLEAR MAGNETIC SPIN RESONANCE

[75] Inventors: Wilfried Bergmann, Erlangen; Berthold Kiuttel, Rheinstetten-Morsch, both of Germany

[73] Assignee: Kraftwerk Union Aktiengesellschaft, Mülheim, Germany

[21] Appl. No.: 647,703

[22] Filed: Jan. 9, 1976

[30] Foreign Application Priority Data

Jan. 17, 1975 [DE] Fed. Rep. of Germany ....... 2501794

[51] Int. Cl.² .......................................... G01R 33/08
[52] U.S. Cl. ............................... 324/0.5 B; 324/0.5 R
[58] Field of Search ............. 324/0.5 R, 0.5 B, 34 FL

[56] References Cited

U.S. PATENT DOCUMENTS

| | | | |
|---|---|---|---|
| 3,191,119 | 6/1965 | Singer | 324/0.5 B |
| 3,419,793 | 12/1968 | Genthe et al. | 324/0.5 B |
| 3,419,795 | 12/1968 | Genthe et al. | 324/0.5 B |
| 3,573,607 | 4/1971 | Whitesel | 324/0.5 B |
| 3,932,805 | 1/1976 | Abe | 324/0.5 R |

OTHER PUBLICATIONS

J. H. Battocletti, W. R. Vander Heyden, W. K. Genthe, NMR Applied To Flow Measurement, Instrumentation Technology, Nov. 1968, pp. 53–58.

*Primary Examiner*—M. Tokar
*Attorney, Agent, or Firm*—Herbert L. Lerner

[57] ABSTRACT

A method of measuring the quantity of a flowing fluid through the use of nuclear magnetic spin resonance which includes; passing a fluid containing magnetizable nuclei and having portions of different flow velocities through a pipe of non-magnetic electrically insulating material; applying a direct-current magnetic field to the fluid to align the nuclei spin axes thereof; applying an alternating-current magnetic field to the fluid to synchronize the nuclei; and measuring the resultant nuclear magnetization and the velocity of respective different portions of the fluid with respect to time, the sum of the products of velocity and nuclear magnetization of the portions providing a measure of the quantity of the fluid.

11 Claims, 8 Drawing Figures

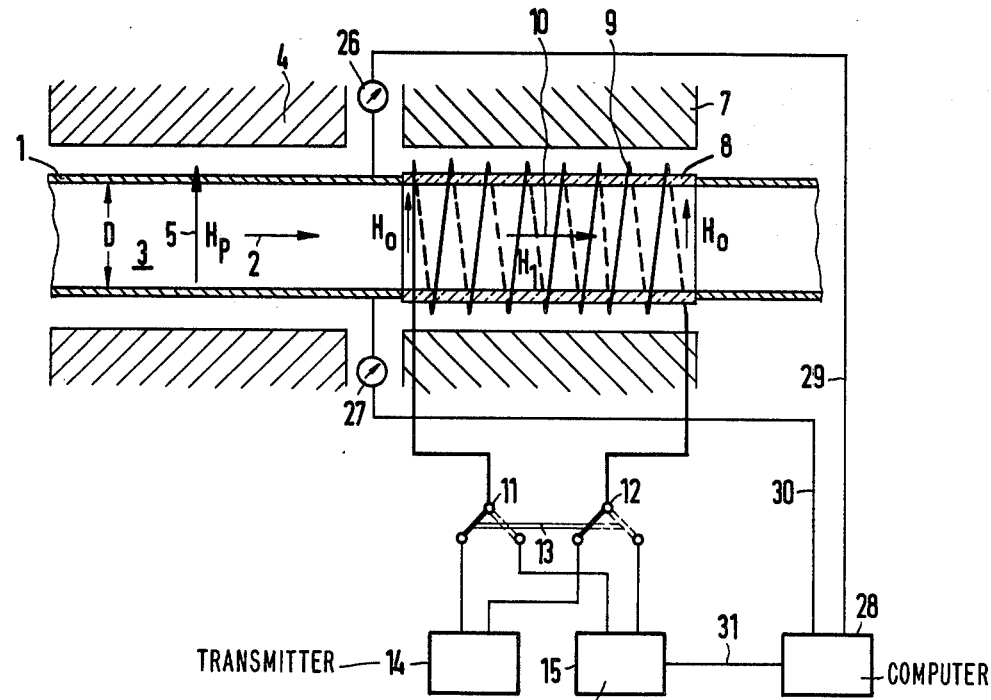
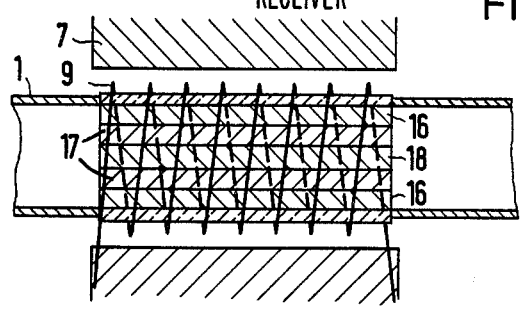
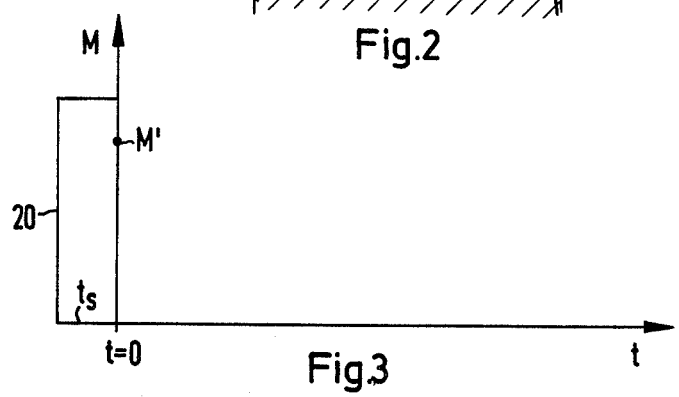

METHOD AND APPARATUS FOR MEASURING THE QUANTITY OF A FLUID FLOWING THROUGH A PIPE BY MEANS OF NUCLEAR MAGNETIC SPIN RESONANCE

BACKGROUND OF THE INVENTION

1. Field of the Invention

The invention relates to a method and apparatus for measuring the quantity of a fluid flowing through a pipe by means of nuclear magnetic spin resonance, where magnetizable nuclei of the fluid are aligned by a d-c magnetic field and are synchronized by an a-c magnetic field, so that a subsequent evaluation of the magnetization of the nuclei can be performed.

2. Description of the Prior Art

From U.S. Pat. Nos. 3,551,794, 3,559,044 and 2,562,632 it is known that conclusions can be drawn from the nuclear magnetization as to a quasi "mean" flow velocity. For this purpose, pulsed synchronization of the aligned nuclei, for example, makes possible the transit time measurement of passing mass components. This permits the establishment of a relationship with the flow velocity. The accuracy of the measurement is limited, however, as the velocity distribution over the cross section of the pipe is not taken into consideration. The aforementioned heretofore known method can therefore furnish usable volume thoughput results only by means of calibration measurements, which must be carried out for all possible flow operating conditions. Thus, the only advantage remaining over mechanical flow meters is that the interior of the fluid-carrying pipe need not be disturbed by inserts that might be corrosion-sensitive. Also, the heretofore known method can be used only for the determination of the volume flow rate of single-phase fluids.

SUMMARY OF THE INVENTION

It is therefore an object of the invention of the instant application to make possible a far more accurate measurement, in which the flow rate itself can be determined as a reproducible result from the directly measured data of the nuclear magnetization. Such a measurement method is important particularly if the amount flowing through the pipe should vary very greatly, so that a calibration for each individual operating condition is not practical.

With the foregoing and other objects in view, there is provided in accordance with the invention, a method of measuring the quantity of a flowing fluid through the use of nuclear spin resonance which comprises passing a fluid containing magnetizable nuclei and having portions of different flow velocities through a pipe of non-magnetic electrically insulating material; applying a direct-current magnetic field to the fluid to align the nuclei spin axes thereof; applying an alternating-current magnetic field to the fluid to synchronize the nuclei; and measuring the resultant nuclear magnetization and the velocity of respective different portions of the fluid with respect to time, the sum of the products of velocity and nuclear magnetization of the portions providing a measure of the quantity of the fluid.

In accordance with another feature of the method of the invention, the alternating-current magnetic field is applied in the form of synchronizing signal pulses at a given location along the different portions passing the location at spaced intervals of time to determine the velocities of the portions.

In accordance with a further feature of the method of the invention, another direct-current magnetic field is applied at the given location.

The invention utilizes the fact that there are different local flow velocities over the cross section of the pipe by determining isochronous flow groups i.e. portions of the fluid that travel, respectively, at the same velocity, and takes this into consideration directly in the measurement for evaluation. Part of the evaluation is performed by an analytic treatment of the measurement results. A computer may be used to obtain a completely automatic readout of the final result without human intervention. This applies in particular to cases where the method of the invention is used for measurement in production plants or the like which are operated over extended periods of time. If the method of the invention is used for experiments, the evaluation can also be performed by "manual" mathematical calculation.

The method of the invention is suited not only for an absolute determination of the mass throughput of homogeneous fluids by resolving the total throughput into individual isochronous flow groups which are determined and summed step-wise in accordance with the velocity profile in the pipe that carries the flow, but rather it is also possible to utilize the method in the case where a two-phase flow is present i.e. a flow of two mass components of different density. This is applicable not only to the case of a mixture of two different substances, but also to the case, which may possibly be even more important, where a single substance, under certain operating conditions, may be present both in the liquid as well as in the gaseous phase. For such a case, in accordance with yet another feature of the method of the invention, the pressure and temperature of the fluid are determined. By comparison of the nuclear magnetization of a flow group with relaxation times possible for the two phases, the phase distinction of the flow group is determined and taken into account in the summation. Here, too, the computing effort required for the comparison can be automated, as will be described hereinafter in further detail.

In accordance with the invention, apparatus utilizing the foregoing method of measuring the quantity of a flowing fluid through the use of nuclear magnetic spin resonance is provided comprising a pipe of non-magnetic electrically insulating material, means for passing a flow of a fluid containing magnetizable nuclei and having portions of different flow velocities through the pipe, means for applying a direct-current magnetic field to the fluid to align the nuclei spin axes thereof, means for applying an alternating-current magnetic field to the fluid to synchronize the nuclei, and means for measuring an output signal from the fluid responsive to the alternating-current magnetic field at spaced intervals of time, the output signal being a measure of the nuclear magnetization and velocity of respective different portions with respect to time.

In accordance with another feature of the apparatus of the invention, the means for applying an alternating-current magnetic field includes a source of synchronizing signal pulses at a given location along the pipe, the measuring means including means for measuring a change in voltage of the different portions flowing past the given location at spaced intervals of time.

In accordance with a further feature of the apparatus of the invention, the source of synchronizing signal pulses includes a coil around the pipe at the given location and a pulse transmitter connected to the coil.

In accordance with an added feature of the apparatus of the invention, the means for measuring the output signal is a receiver connected to the coil, and the apparatus further includes switching means for alternately connecting the transmitter and the receiver to the coil.

In accordance with an additional feature of the apparatus of the invention, digital readout means for measuring the voltage changes are also provided.

In accordance with a concomitant feature of the apparatus of the invention, means for measuring pressure and temperature of the fluid are included.

While the method and apparatus of the invention not only provides a much greater accuracy than the heretofore known methods and apparatus of this general type, and also render measurements possible under flow conditions wherein the heretofore known methods fail completely, a further simplification over the heretofore known apparatus for practicing the state-of-the-art methods is possible. For example, a single coil can be employed both to supply the a-c magnetic field and to determine the nuclear magnetization.

Other features which are considered as characteristic for the invention are set forth in the appended claims.

Although the invention is illustrated and described herein as embodied in method and apparatus for measuring the quantity of a fluid flowing through a pipe by means of nuclear magnetic spin resonance, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings.

BRIEF DESCRIPTION OF THE DRAWINGS

FIG. 1 is a diagrammatic view of the apparatus according to the invention for carrying out the method of measuring the quantity of a flowing fluid through the use of nuclear magnetic spin resonance;

FIG. 2 is a fragmentary view of FIG. 1 showing the measurement apparatus in operation at the start of a given measuring cycle;

FIG. 3 is a plot diagram of a magnetization pulse applied at the start of a given time period;

DESCRIPTION OF THE REFERRED EMBODIMENT

Figure 4:
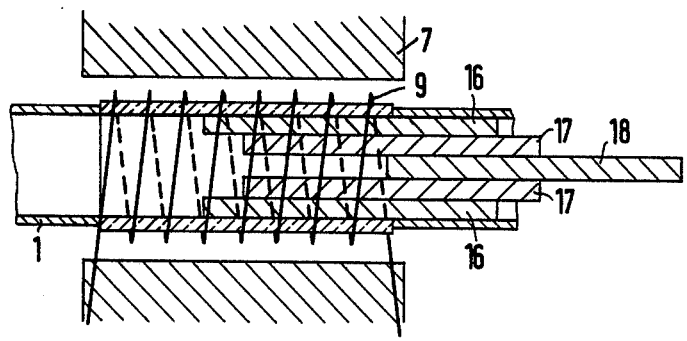
FIG. 4 is another view of FIG. 2 at a different phase of the operation of the apparatus wherein various fluid flow portions have been displaced over a given time period.

Referring now to the drawing and first, particularly, to FIG. 1 thereof, it is assumed that a liquid is contained in a non-illustrated vessel under high pressure and at a high temperature and flows out therefrom upon the sudden clearing of an aperture. The vessel may be the reactor pressure vessel of a pressurized-water reactor or a model thereof, which contains water ($H_2O$), for example at a pressure of 150 atmospheres and a temperature of 300° C. The sudden outflow may occur upon rupture of a main coolant line, which is to be reckoned as the greatest hypothetical accident. In this connection, it should be mentioned that such an accident can be precluded with very great probability through suitable technical design and continuous monitoring. The underlying basis of the specific embodiment of the invention, is therefore actually a theoretical assumption for purposes of scientific observation and additional safety considerations.

As shown in FIG. 1, a quantity of fluid 3, which is a two-phase mixture of water and steam, flows from a non-illustrated reactor pressure vessel or model thereof in the direction of an arrow 2, through a pipe 1 having a diameter D. To measure the quantity of fluid 3, a d-c magnetic field, having a magnetic field strength $H_p$ of 15 kOe, for example in the direction of the arrow 5, is produced by a magnet 4, which is also referred to as the polarizer. This d-c magnetic field causes the spins of the hydrogen nuclei, which are normally presented in disorder in the flow, to be aligned with their spin axes in the d-c magnetic field.

A magnet 7 is disposed behind or downstream of the magnet 4, as seen in the direction of flow represented by the arrow 2. The magnet 7 forms part of a magnet system termed the analyzer, surrounding a tube 8 which forms a section of pipe 1. The tube 8 is made of non-magnetic and electrically insulating non-conductive material and is preferably formed of ceramic material. The entire pipe 1 may, of course, be formed of ceramic material, but as to the material in the vicinity of the polarizer 4 it is sufficient to be non-magnetic.

The analyzer includes an a-c magnetic field $H_1$ in addition to the d-c magnetic field with the magnetic field strength $H_o$ extending in the direction of the arrows associated therewith. The a-c magnetic field $H_1$ is produced by a coil 9 and extends in the direction of the arrow 10.

The field strength $H_o$ depends upon the frequency $100_1$ of the a-c magnetic field, which is influenced, in turn, by the diameter D of the pipe 1. For pipes with $D$ = 1, 5 and 10 cm, frequencies of about 60, 25 and 10 MHz, for example, are suitable and, correspondingly, field strengths of about 14.09, 5.87 and 2.35 kOe. $H_o$ is thus equal to or smaller than $H_p$.

Terminals 11 and 12 of the coil 9 lead to a double-pole switch 13 which actually operates electronically, and not mechanically as shown for convenience of illustration in FIG. 1. In one portion of the switch 13, the coil 9 is connected to a transmitter 14, and in the other position of the switch 13, as shown by the broken lines, the coil 9 is connected to a receiver 15 which permits the measurement of a voltage corresponding to the change of the nuclear magnetization in the vicinity of the coil 9.

The measurement procedure and evaluation provided in accordance with the invention of the instant application is hereinafter described in a greatly simplified version thereof;

As shown in FIG. 2, the pipe 1, at a given instant in the analyzer in the vicinity of the coil 9, contains a given nuclearly magnetized quantity of fluid which is formed of three isochronous flow groups with different velocities $v_i$ that can be visualized, for example, as concentric cylinder 16, 17 and 18. As is well known, the velocity distribution in the pipe 1 depends on various factors, such as whether laminar or turbulent flow is present, among other factors.

FIG. 3 shows the nuclear magnetization M' present at the instant $t_o = 0$ at the end of the synchronizing transmitting signal pulse 20, which is supplied by the transmitter 14 with the aid of the coil 9. For the sake of simplicity, FIG. 3 which shows the magnetization M versus the time $t$, illustrates the transmitting pulse as a square pulse, although it actually consists of a high frequency field with the amplitude $2H_1$, radiated during the time $t_s$. In the following considerations, the fringe effects at the ends of the coil 9 are also neglected.

Figure 5:
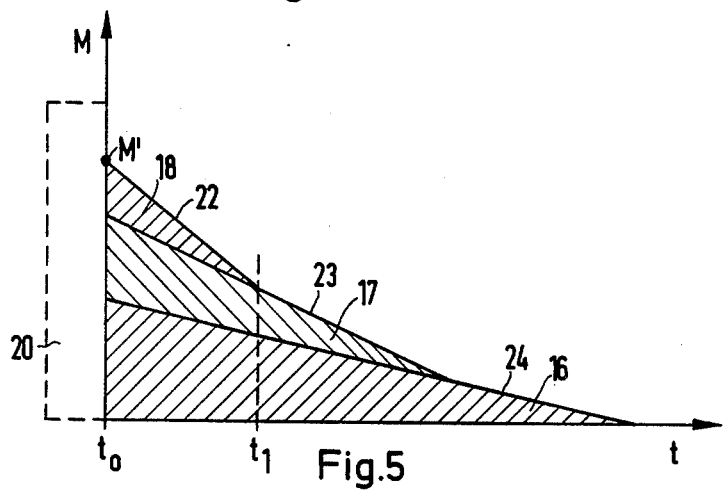
FIG. 5 is a plot diagram of the magnetization measurements obtained during the time period in which the operating conditions shown in FIG. 4 occurred.

FIG. 4 illustrates the displacement constituting the flow and thereby the mass throughput for the fluid quantity shown at the instant $t_o$ in FIG. 2 up to the instant $t_1$. It is apparent that the isochronous flow group 18, which is the innermost cylinder of uniformly moving elements, has travelled completely out of the coil 9. The hollow cylinder 17 of the next isochronous flow group surrounding the cylinder 18 has travelled about halfway out of the coil 9, while the outer cylinder 16 of the third isochronous flow group has left only one-third of the coil 9. From this, the magnetization M(t) shown in FIG. 5 is obtained. This can be measured by coil 9 as an induced voltage having a change in time resulting from the spatial relationship of the flow groups relative to the coil 9.

Accordingly, the magnetization of the velocity group 18 can no longer be measured by the coil 9 through the receiver 15 at the instant $t_1$. This is so because the magnetization of the group 18, which can be detected by the coil 9, has decayed linearly toward zero in the time interval between $t = 0$ and $t_1$, according to the curve section 22, as this entire group 18 has travelled out of the measuring range of the coil 9. The magnetization of the flow group 17 has also dropped to one-half of the original value shown on the ordinate. The corresponding decay curve is designated as 23. For the flow group 16, two-thirds of the original magnetization is still present. This group 16 had the largest value at the instant $t_o$, and decays most slowly along the straight line 24 in accordance with the velocity thereof.

Figure 6:
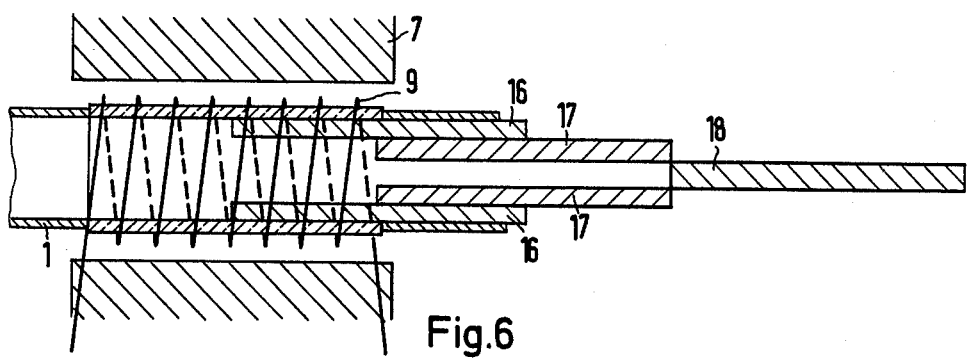
FIG. 6 is yet another view of FIGS. 2 and 4 at yet a different operating phase of the apparatus.
Figure 7:
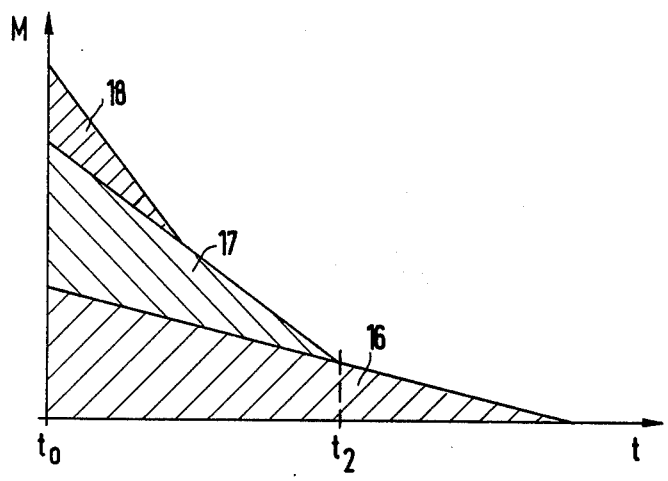
FIG. 7 is a plot diagram of the magnetization measurements obtained during the time period in which the operating conditions shown in FIG. 6 occurred.

In FIG. 6, the position in space of the isochronous flow groups 16, 17 and 18 is shown at a third point in time or instant $t_2$ at which the flow group 17 has just left the region of the coil 9 operating for the receiver 15, so that the nuclear magnetization of the flow group 17 detectable by the coil 9 has become zero, as shown in FIG. 7. Thus, only the magnetization of the flow group 16, which has decayed to one-third of the original magnetization, remains as the residual nuclear magnetization.

The evaluation of the course i.e. decay, in time of the nuclear magnetization measured by the coil 9 is now performed. This is done by forming a sufficiently finely subdivided family of tangents to the curve M(t), as illustrated in FIGS. 3, 5 and 7, for the instantaneous voltage values of the coil 9, which are determined by means of the receiver 15. This results in a steadily declining curve M (t). From this, if the nuclear magnetizations of the flow group are re-calculated according to their velocities, corresponding isochronous flow groups can then be derived as to velocity and nuclear magnetization. The sum of the products of the latter two values then provides the mass flow density of the quantity. In constrat to the hereinaforedescribed state-of-the-art method, one can therefore analytically obtain the mass throughput directly, without correlating a volume throughput by calibration of a particular transit time measured by means of the nuclear magnetization as in the heretofore known method.

As shown further in FIG. 1, a manometer 26 and a thermometer 27 may be connected to the pipe 1 in the region between the polarizer 4 and the analyzer 7. Both of the instruments 26 and 27 are of such construction that they permit the determination of the changes of the pressure and the temperature of the fluid quantity to be measured which flows through virtually without inertia. The values of the pressure and temperature changes are preferably recorded in digital form, which may be provided by a computer 28 connected not only to the manometer 26 and the thermometer 27 through lines 29 and 30, but also to the receiver 15 through a line 31. It is therefore possible to correlate the outputs of the receiver 15 simultaneously with those of the manometer 26 and the thermometer 27.

As long as quasi-stationary thermodynamic state can be assumed for the water-steam mixture flowing in the pipe 1, the pressure, temperature and densities of the liquid and the steam components correspond to the saturation state of the water. Therefore, since the voltage $U_i(o)$ of the flow groups, which is induced by the nuclear magnetization, is also influenced by the relaxation time $T_{ij}$, which is different for water and steam, the proportions of liquid and steam in the maeasured values can be correlated as follows.

$$U_i(o) = \frac{8\pi^2 v_1 N_i \delta^2 \hbar^2 I (I + 1) H_p l_p \cdot F \cdot n \cdot Q}{10^8 \cdot 3kT \cdot T_{ij} v_j}$$

where:

$N_i$ is the spin density of the velocity group
I is the spin quanta number of the precessing nucleus
$\gamma$ is the gyromagnetic ratio of the precessing nucleus
$\hbar$ is Planck's constant
$k$ is Boltzmann's constant
T is the absolute temperature
$l_p$ is the length of the polarizer
F is the winding surface area of the coil
n is the number of turns of the coil 9
Q is the Q of the coil 9.

The different relaxation time is expressed as a break in the steadily declining curve of the nuclear magnetization M(t), as measured by the coil 9, plotted against time. The derivative of the curve with respect to time is discontinuous. In this manner, it is possible to determine the proportion of mass throughput corresponding to each isochronous flow group. This also makes it possible to determine the mass throughput of two-phase mixtures by this method of nuclear resonance magnetization of the velocity groups.

Since the model described with respect to the drawing as a specific embodiment is greatly simplified, there is provided hereinafter a table which lists various values that can be obtained from measurements of the voltage $U_i(t)$ corresponding to the nuclear magnetization and its progress or course in time, namely, the velocity $v_i$; the differential quotient of the voltage with respect to time (the slope of the tangent) $\dot{U}_i$; the difference of the differential quotients of the flow groups with contiguous velocities $\Delta U_i$ and the equilibrium value of the nuclear magnetization of the flow group, expressed as the voltage $\ddot{U}_i$. The foregoing values are listed for eight flow groups $i = 1$ to 8, from which the mass throughput is obtained as the sum of the mass throughout components of the eight velocity groups.

Figure 8:
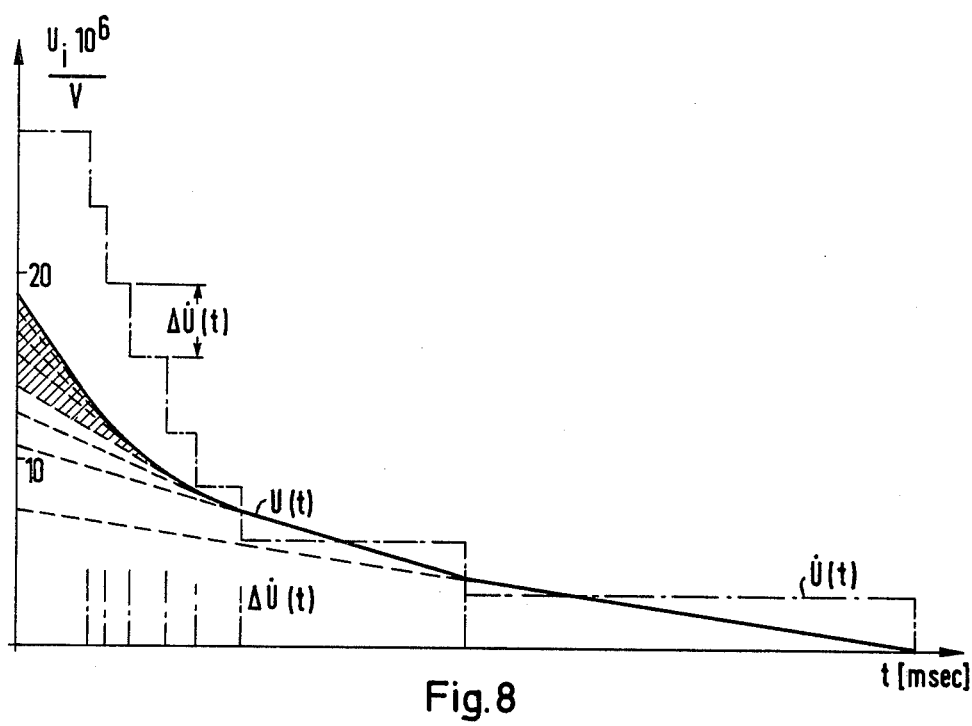
FIG. 8 is a plot diagram of the nuclear magnetization, measured as voltage, with respect to time according to the accompanying Table.

It is evident that the values given in the table, insofar as they are derived from the directly measurable voltage value $U_i(o)$, can be obtained automatically by means of simple computer programs, since the operations required for the derivation comprise simple mathematical functions. The curve of the nuclear magnetization $M(t)$, measured as the voltage $U(t)$, and belonging to the Table is shown in FIG. 8; tha area of the four vaporous flow groups is specifically emphasized by shading.

Table

| Flow group (Phase state) | Velocity $v_i$[cm·s$^{-1}$] | Voltage of nuclear magnetization $U_i(o)\cdot 10^6$ V | Slope of tangent $\dot{U}_i(t_i)\cdot 10^4$ s V | Slope difference $\ddot{U}_i(t_i)\cdot 10^4$ s V | Voltage of equilibrium magnetization $\ddot{U}_i(o)\cdot 10^3$ V | Mass throughput $\dot{M}_i$[g·s$^{-1}$] |
|---|---|---|---|---|---|---|
| 1 (l) | 500 | 7.17 | 1,434 | 1,434 | 4,350 | 173.54 |
| 2 (l) | 1000 | 3.59 | 2,870 | 1,436 | 4,351 | 347.16 |
| 3 (l) | 2000 | 1.79 | 4,302 | 1,432 | 4,344 | 693.20 |
| 4 (l) | 2500 | 1.44 | 5,747 | 1,440 | 4,376 | 872.89 |
| 5 (v) | 3000 | 1.68 | 7,758 | 2,016 | 1,418 | 339.42 |
| 6 (v) | 4000 | 1.26 | 9,774 | 2,016 | 1,418 | 452.56 |
| 7 (v) | 5000 | 1.01 | 11,794 | 2,020 | 1,422 | 567.30 |
| 8 (v) | 6000 | 0.840 | 13,810 | 2,016 | 1,418 | 678.84 | l ~ liquid
v ~ vaporous $U(o) = 18,78$ measured value

Phase discrimination criterion $\ddot{U}(o) = 23,103$ weighted measured value $\dot{M} = 4124.90$ The equilibrium magnetization $\ddot{M}_i(o)$ selected as a reference quantity for the summation could be obtained by exposing the fluid to the polarizing field for a sufficiently long time. For the practical realization of the invention, this quantity can be determined, however, from the partial magnetization of the flow group, which is inversely proportional to the velocity of the group considered, as was shown here. Neglecting second order errors, the equilibrium magnetization can be determined from the measured partial magnetization by a factor which consists of the product of the relaxation time $T_{ij}$ and the velocity $v_i$ of the flow group, divided by the length $l_p$ of the polarizing structure in the longitudinal direction of the pipe 1:

$$\ddot{U}_i(o) \approx U_i(o) \frac{T_{ij}\cdot v_i}{l_p}.$$

There are claimed:

1. A method of measuring the quantity of a flowing fluid through the use of nuclear magnetic spin resonance which comprises passing a fluid containing magnetizable nuclei and having portions of different flow velocities through a pipe of at least partially non-magnetic electrically insulating material; applying a direct-current magnetic field to the fluid at one given location of the pipe to align the nuclei spin axes thereof; applying an alternating-current magnetic field to the fluid at the one given location of the pipe to synchronize the nuclei; and determining the course in time of the nuclear magnetization at the one given location of the pipe, correlating the differential of the course in time to the flow velocity of isochronous flow groups which, together, fill the entire flow cross section of the pipe at the beginning of the determined course in time, the sum of the products of the flow velocity and the corresponding instantaneous values of the course in time of the nuclear magnetization providing a measure for the mass flow density of the fluid.

2. The method of claim 1 wherein the alternating current magnetic field is applied in the form of synchronizing signal pulses at a given location along the pipe, the measuring of the nuclear magnetization including measuring a change in voltage of the different portions passing the location at spaced intervals of time to determine the velocities of the portions.

3. The method of claim 2 which includes applying another direct-current magnetic field at the given location.

4. The method of claim 3 which includes measuring the pressure and temperature of the fluid to permit a determination of the proportions of the different portions.

5. Apparatus utilizing the method of claim 1 comprising a pipe of non-magnetic electrically insulating material; means for passing a flow of a fluid containing magnetizable nuclei and having portions of different flow velocities through said pipe; means for applying a direct-current magnetic field to the fluid at one given location of said pipe to align the nuclei spin axes thereof; means for applying an alternating-current magnetic field to the fluid at said one given location of said pipe to synchronize the nuclei; and means for measuring at said one given location of said pipe an output signal from the fluid responsive to said alternating-current magnetic field at spaced intervals of time, said output signal being a measure of the nuclear magnetization and velocity of respective different portions with respect to time.

6. The apparatus of claim 5, wherein said means for applying an alternating-current magnetic field includes a source of synchronizing signal pulses at a given location along said pipe, said measuring means including means for measuring a change in voltage of the different portions flowing past said given location at spaced intervals of time.

7. The apparatus of claim 6 including means for applying another direct-current magnetic field to the fluid at said given location.

8. The apparatus of claim 7 wherein said source of synchronizing signal pulses includes a coil around said pipe at said given location and a pulse transmitter connected to said coil.

9. The apparatus of claim 8 wherein said means for measuring said output signal is a receiver connected to said coil, and including switching means for alternatively connecting said transmitter and said receiver to said coil.

10. The apparatus of claim 9 including digital readout means for measuring said voltage change.

11. The apparatus of claim 9 including means for measuring pressure and temperature of the fluid.

* * * * *